(12) United States Patent
Golightly et al.

(10) Patent No.: US 10,938,037 B2
(45) Date of Patent: Mar. 2, 2021

(54) ENERGY STORAGE DEVICES CONTAINING A CARBON NANOTUBE AEROGEL AND METHODS FOR MAKING THE SAME

(71) Applicant: LOCKHEED MARTIN CORPORATION, Bethesda, MD (US)

(72) Inventors: Justin Samuel Golightly, Belmont, CA (US); Mark Joseph Isaacson, Santa Clara, CA (US); Jonathan W. Ward, San Jose, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 1708 days.

(21) Appl. No.: 14/194,531

(22) Filed: Feb. 28, 2014

(65) Prior Publication Data
US 2014/0248533 A1    Sep. 4, 2014

Related U.S. Application Data

(60) Provisional application No. 61/772,485, filed on Mar. 4, 2013.

(51) Int. Cl.
*H01M 4/00* (2006.01)
*H01M 4/82* (2006.01)
*H01M 4/136* (2010.01)
*H01M 4/62* (2006.01)
*H01M 10/052* (2010.01)
(Continued)

(52) U.S. Cl.
CPC ............ *H01M 4/82* (2013.01); *H01M 4/043* (2013.01); *H01M 4/0416* (2013.01);
(Continued)

(58) Field of Classification Search
CPC .. H01M 10/052; H01M 4/043; H01M 4/0471; H01M 4/136; H01M 4/661
(Continued)

(56) References Cited

U.S. PATENT DOCUMENTS

2009/0311604 A1* 12/2009 Nazar ................... H01M 4/364
                                                                        429/231.8
2012/0064388 A1*  3/2012 Whitacre .......... H01M 10/0585
                                                                        429/160
(Continued)

FOREIGN PATENT DOCUMENTS

WO    WO 2012138803 A2 * 10/2012 ............. B82Y 30/00

OTHER PUBLICATIONS http://www.dynacer.com/processing/hot-pressing/ accessed Feb. 14, 2017.*
(Continued)

*Primary Examiner* — Cynthia H Kelly
*Assistant Examiner* — Monique M Wills
(74) *Attorney, Agent, or Firm* — Morgan, Lewis & Bockius LLP

(57) ABSTRACT

Conventional rechargeable batteries, such as lithium-ion batteries, are somewhat limited in their energy storage density. Sulfur-based batteries can provide improved energy storage density, but their use can be hampered by sulfur's low electrical conductivity. Energy storage devices, particularly batteries, can have a first electrode that includes a carbon nanotube aerogel, and an electroactive material containing sulfur that is incorporated in the carbon nanotube aerogel. Methods for forming an energy storage device can include incorporating an electroactive material containing sulfur in a carbon nanotube aerogel, compressing the carbon nanotube aerogel to form a compressed carbon nanotube aerogel, and disposing a first electrode containing the compressed carbon nanotube aerogel and the electroactive material in an electrolyte with a second electrode and a plurality of lithium ions, such that a separator material permeable to the lithium ions is between the first electrode and the second electrode.

18 Claims, 3 Drawing Sheets

(51) Int. Cl.
  *H01M 4/04*    (2006.01)
  *H01M 4/38*    (2006.01)
  *H01M 4/58*    (2010.01)
  *H01M 4/66*    (2006.01)

(52) U.S. Cl.
  CPC .............. *H01M 4/136* (2013.01); *H01M 4/38* (2013.01); *H01M 4/625* (2013.01); *H01M 10/052* (2013.01); *H01M 4/0471* (2013.01); *H01M 4/5815* (2013.01); *H01M 4/661* (2013.01); *Y10T 29/49108* (2015.01)

(58) Field of Classification Search
  USPC ....................................................... 429/211
  See application file for complete search history.

(56) References Cited

U.S. PATENT DOCUMENTS

| | | | | |
|---|---|---|---|---|
| 2012/0264017 A1* | 10/2012 | Nazri | .................. | H01M 4/0423 429/218.1 |
| 2012/0301360 A1* | 11/2012 | Meinhold | .......... | B01J 20/28047 422/68.1 |
| 2013/0183550 A1* | 7/2013 | Kourtakis | ............. | H01M 4/622 429/50 |
| 2013/0216894 A1* | 8/2013 | Wang | ...................... | H01M 4/13 429/158 |
| 2014/0012034 A1* | 1/2014 | Shaffer | ................ | B01J 13/0091 560/56 |
| 2014/0065447 A1* | 3/2014 | Liu | ....................... | H01M 4/131 429/7 |

OTHER PUBLICATIONS

Bordbija, New Class of Carbon-Nanotube Aerogel Electrodes for Electrochemical Power Sources, Jan. 29, 2008, Advanced Materials, vol. 20, Issue 4, pp. 815-819.*

* cited by examiner

ENERGY STORAGE DEVICES CONTAINING A CARBON NANOTUBE AEROGEL AND METHODS FOR MAKING THE SAME

CROSS-REFERENCE TO RELATED APPLICATIONS

This application claims the benefit of priority under 35 U.S.C. § 119 from U.S. Provisional Patent Application 61/772,485, filed Mar. 4, 2013, which is incorporated herein by reference in its entirety.

STATEMENT REGARDING FEDERALLY SPONSORED RESEARCH OR DEVELOPMENT

Not applicable.

FIELD

The present disclosure generally relates to energy storage, and, more specifically, to energy storage using carbon nanomaterials.

BACKGROUND

The growing popularity of portable electronic devices and other consumer electronics has greatly increased global demand for enhanced rechargeable battery technologies. Although lithium-ion batteries are widely used at present throughout the electronics industry and in other areas, there are persistent limitations to these batteries that still remain to be addressed. The relatively low energy density of conventional lithium-ion batteries is one of the major issues limiting the expanded use of these batteries in a broader realm of consumer and commercial applications. Although rare, safety issues of lithium-ion batteries can also be problematic.

Conventional lithium-ion batteries include an electrolyte containing lithium ions configured such that the lithium ions can migrate back and forth between a cathode and an anode during charging and discharging cycles. When charging, lithium ions migrate to the anode, and during discharge, they migrate to the cathode. Typical anode materials in lithium-ion batteries include silicon and carbon, in which the lithium ions can readily intercalate. On the cathode side, typical materials include porous supports such as lithium cobalt oxide, lithium iron phosphate, lithium manganese oxide, and lithium nickel manganese cobalt oxide. Lithium cobalt oxide generally produces the highest energy density values in lithium-ion batteries, but it can lead to safety issues. The latter materials offer improved safety at the cost of lower energy densities. Most conventional lithium-ion batteries offer energy densities of about 130 to 200 W·h/kg.

In lithium-sulfur batteries, the intercalating anodes of lithium-ion batteries can be replaced with anodes formed from metallic lithium. Improved energy densities can be realized in lithium-sulfur batteries. Conventional lithium-sulfur batteries can have energy densities in the vicinity of 350 W·h/kg, although they can theoretically be much higher, up to about 1600 W·h/kg. Without being bound by theory or mechanism, it is believed that the increased energy density in lithium-sulfur batteries can result from the ability of each sulfur atom to react with two lithium ions, in contrast to typical lithium-ion batteries which only can accommodate 0.5-0.7 lithium ions per intercalating host atom.

Although lithium-sulfur batteries can display energy densities that are superior to those of lithium-ion batteries, there are a number of difficulties associated with their effective use. Foremost, sulfur is an insulator that can detrimentally impact battery performance. Thus, even though sulfur has a high capacity for holding lithium ions in an electrode, the enhanced energy density can be at least partially offset by the insulating properties of sulfur. Strategies for overcoming the low electrical conductivity of sulfur can dramatically increase the cost of lithium-sulfur batteries, as well as reduce their energy density. In addition, electrolyte-soluble lithium polysulfides can form in a lithium-sulfur battery, thereby decreasing the amount of sulfur available for reacting with lithium ions at the cathode and degrading performance of the battery over repeated charge and discharge cycles. Without being bound by theory or mechanism, it is believed that electrolyte-soluble lithium polysulfides can migrate to the anode during operation, thereby decreasing the amount of sulfur remaining at the cathode for charge storage. Moreover, volume expansion upon converting sulfur into lithium sulfide can place tremendous mechanical stress upon a cathode, thereby leading to its degradation over time.

In view of the foregoing, lithium-sulfur batteries offering improved performance and a decreased incidence of degradation would represent a substantial advance in the art. The present disclosure satisfies the foregoing need and provides related advantages as well.

SUMMARY

In various embodiments, energy storage devices containing a carbon nanotube aerogel are described herein. In some embodiments, the energy storage devices described herein can include a first electrode that contains a carbon nanotube aerogel and an electroactive material containing sulfur that is incorporated in the carbon nanotube aerogel.

In various embodiments, methods for making energy storage devices from a carbon nanotube aerogel are described herein. In some embodiments, the methods include incorporating an electroactive material containing sulfur in a carbon nanotube aerogel, compressing the carbon nanotube aerogel to form a compressed carbon nanotube aerogel, and disposing a first electrode including the compressed carbon nanotube aerogel and the electroactive material in an electrolyte with a second electrode and a plurality of lithium ions. The first electrode and the second electrode have a separator material therebetween that is permeable to the lithium ions.

The foregoing has outlined rather broadly the features of the present disclosure in order that the detailed description that follows can be better understood. Additional features and advantages of the disclosure will be described hereinafter. These and other advantages and features will become more apparent from the following description taken in conjunction with the drawings.

BRIEF DESCRIPTION OF THE DRAWINGS

For a more complete understanding of the present disclosure, and the advantages thereof reference is now made to the following descriptions to be taken in conjunction with the accompanying drawings describing specific embodiments of the disclosure, wherein.

DETAILED INSCRIPTION

The present disclosure is directed, in part, to energy storage devices containing a carbon nanotube aerogel. The present disclosure is also directed, in part, to methods for making energy storage devices from a carbon nanotube aerogel.

As discussed above, there are a number of issues associated with the use of conventional lithium-sulfur batteries. Most significantly, overcoming the poor electrical conductivity of sulfur can be problematic, costly and performance-reducing. Moreover, performance degradation due to mechanical stress and formation of electrolyte-soluble lithium polysulfides has not been readily addressed in conventional lithium-sulfur batteries.

The present inventors recognized that the foregoing issues could all be addressed at least to some degree by utilizing a carbon nanotube supporting matrix for sulfur in a lithium-sulfur battery or like energy storage device. More particularly, the present inventors recognized that a carbon nanotube aerogel could be used to contain sulfur or a polymorph thereof within its internal porosity. Containing sulfur in this manner can provide a number of advantages in terms of addressing the shortcomings of conventional lithium-sulfur batteries, as discussed hereinafter.

Before further discussing the advantages that carbon nanotube aerogels can provide in sulfur-based energy storage devices, a brief description of carbon nanotube aerogels will first be provided so that those advantages can be better understood. A more detailed description of carbon nanotube aerogels is also provided hereinbelow.

As used herein, the term "carbon nanotube aerogel" refers to a highly porous, low density structure formed from carbon nanotubes. Carbon nanotube aerogels are to be distinguished from as-produced carbon nanotube mats or papers on the basis of their porosity. A carbon nanotube aerogel can be monolithic in nature, in some embodiments. In various embodiments, a carbon nanotube aerogel can be produced via removal of solvent from a frozen carbon nanotube solution, particularly by sublimation, as described in commonly owned U.S. patent application Ser. No. 13/288,895, filed on Nov. 3, 2011 and incorporated herein by reference in its entirety. As described therein, carbon nanotube aerogels having a relatively uniform pore size can be obtained by subliming solvent from a concentrated solution of carbon nanotubes (i.e., by lyophilizing or freeze drying). As used herein, the term "solution" refers to both true solutions in which carbon nanotube solubility is complete and stable suspensions in which carbon nanotubes are dispersed from one another but not fully solubilized. An initially produced carbon nanotube aerogel can be further compressed following its formation in order to provide a desired shape, thickness, density and degree of porosity.

Figure 1:
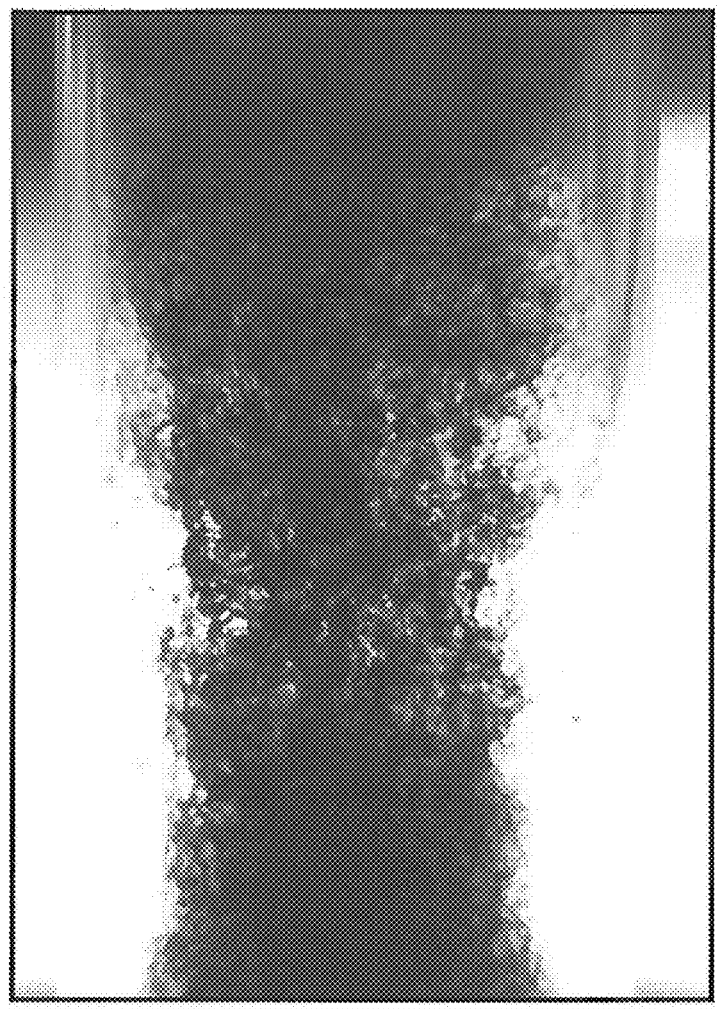
FIG. 1 shows a photograph of an illustrative as-produced carbon nanotube aerogel.
Figure 2:
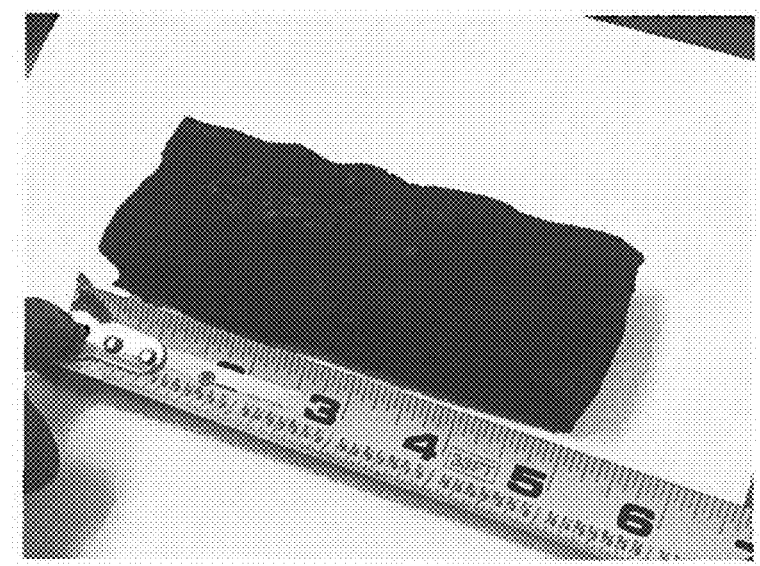
FIG. 2 shows a photograph of an illustrative carbon nanotube aerogel following compression into a monolithic body.

FIG. 1 shows a photograph of an illustrative as-produced carbon nanotube aerogel. FIG. 2 shows a photograph of an illustrative carbon nanotube aerogel following compression into a monolithic body.

As one of ordinary skill in the an will understand with the benefit of this disclosure, carbon nanotubes, and particularly carbon nanotube aerogels, can provide a number of benefits in the context of sulfur-based energy storage devices described herein, especially lithium-sulfur batteries. Foremost, the electrical conductivity of the carbon nanotubes can be used to "shield" or otherwise circumvent the insulating properties of sulfur in an electrode, thereby allowing a high degree of electrical conductivity to be maintained in an energy storage device. Without being bound by any theory or mechanism, it is believed that the carbon nanotubes of a carbon nanotube aerogel can provide a semi-continuous conductive porous network in which sulfur or a polymorph thereof is housed. As used herein, the term "semi-continuous" refers to the condition of carbon nanotubes being in contact with one another. Utilizing a discontinuous dispersion of screening particles to address the insulating properties of sulfur, as practiced conventionally, is believed to be less efficient than is the semi-continuous macrostructure of a carbon nanotube aerogel. Moreover, the porosity of carbon nanotube aerogels allows significant quantities of sulfur to be effectively sequestered within the carbon nanotube aerogel.

The electrical conductivity of the carbon nanotubes in a carbon nanotube aerogel-based electrode can also allow the elimination or minimization of metallic current collectors in an energy storage device, thereby allowing a smaller device footprint and reduced weight to be realized. Moreover, the carbon nanotube concentration, type and functionalization can also be varied within the carbon nanotube aerogel in order to allow tailoring for use in a particular application. Tailoring the carbon nanotube aerogel to have a particular pore size can impact not only the aerogel's ultimate electrical conductivity, but also the amount of sulfur that it can house. In this regard, tailoring of the pore size can also allow adjustment of the ionic mobility to be realized by controlling the relative electrolyte concentration and the transport pathways.

Housing sulfur within the porosity of a carbon nanotube aerogel in an energy storage device can also provide a number of other advantages. The high mechanical strength of the carbon nanotubes can help mitigate and withstand the volume expansion that occurs upon forming lithium sulfide during discharge of the electrical device. Moreover, the highly porous nature of the carbon nanotube aerogel is believed to be better configured to accommodate volume expansion than are more conventional electrode structures. As a further advantage, the porous structure of a carbon nanotobe aerogel can provide a highly randomized, tortuous pathway within the interior of the carbon nanotube aerogel. The tortuous pathway is believed to better contain lithium polysulfides within the carbon nanotube aerogel by limiting their ability to interact with an electrolyte and leech from the electrode environment.

For at least the reasons noted above, carbon nanotube aerogels are believed to be superior to conventional strategies for addressing the insulating properties of sulfur in energy storage devices, both from a cost and performance standpoint. Although the cost of carbon nanotube has traditionally been high, their prices are continually decreasing, and the quantities of carbon nanotubes that are needed for practicing the embodiments described herein is not believed to be cost prohibitive, even at present supplier prices.

As used herein, the term "electroactive material" refers to a substance that is functional to react with lithium ions and reversibly release the lithium ions at a later time.

As used herein, the terms "compress," "compressed," "compression" and other grammatical forms thereof will refer to the act of applying pressure to a structure, particularly a mechanical force that decreases the volume of the structure and increases its density. As used herein, the term "compressed carbon nanotube aerogel" refers to an as-produced carbon nanotube aerogel that has been decreased in volume by application of a compressive force thereto. Compressive forces can include, but are not limited to, squeezing, compacting in a hydraulic press, rolling, and the like.

As used herein, the term "elemental sulfur" refers to a form of sulfur containing predominantly $S_8$ rings, although small amounts of other ring sizes can sometimes be present.

In various embodiments, energy storage devices containing a carbon nanotube aerogel and an electroactive material containing sulfur are described herein. Illustrative energy storage devices can include batteries, capacitors, supercapacitors and the like. In various embodiments, the energy storage devices described herein can be configured as a battery, particularly a rechargeable battery.

In some embodiments, energy storage devices described herein can include a first electrode. The first electrode can include a carbon nanotube aerogel, and an electroactive material containing sulfur that is incorporated in the carbon nanotube aerogel.

In various embodiments, the electroactive material containing sulfur can include elemental sulfur or a polymorph thereof. Forms of elemental sulfur that can be present in the embodiments described herein include, for example, $S_8$ rings (any of α-, β- and γ-polymorphs) and polymeric sulfur (a metastable form that is often referred to as "plastic sulfur"). Other forms of elemental sulfur that can be present in the embodiments described herein include sulfur-containing rings that are larger than $S_8$, such as $S_9$-$S_{20}$ rings. Smaller sulfur rings are also possible.

In some embodiments, an as-produced carbon nanotube aerogel can be used in conjunction with forming the first electrodes described herein. More typically in forming the first electrodes, however, an as-produced carbon nanotube aerogel can be compressed to form a compressed carbon nanotube aerogel. Compression of an as-produced carbon nanotube aerogel can be used to attain a desired pore size, porosity and shape in the compressed carbon nanotube aerogel. Pore sizes that can be attained in the compressed carbon nanotube aerogel are described hereinbelow. The type of compressive force used to compress the carbon nanotube aerogel can constitute any suitable compressive force, including those described elsewhere herein.

In various embodiments, the energy storage devices described herein can further include a second electrode. Specifically, in some embodiments, the energy storage devices described herein can constitute a rechargeable battery in which the first electrode constitutes a cathode of the battery and the second electrode constitutes an anode of the battery. In various embodiments, the second electrode of the energy storage device can be formed from lithium metal or an alloy thereof. In other various embodiments, the second electrode of the energy storage device can be formed from an intercalating anode material, such as those that are used in conventional lithium-ion batteries In various embodiments, the energy storage devices described herein can further include a plurality of lithium ions configured to reversibly travel between the first electrode and the second electrode. That is, in various embodiments, the energy storage devices described herein can undergo charge and discharge cycles that are accompanied by migration of the lithium ions from one electrode to the other. According to the various embodiments described herein, lithium ions can be present on a metallic lithium anode, within the carbon nanotube aerogel of a cathode, or, in an electrolyte in which the anode and cathode are disposed. A description of suitable electrolytes follows hereinafter.

In various embodiments, the energy storage devices described herein can further include an electrolyte in which the first electrode and the second electrode are disposed. The electrolyte can allow migration of lithium ions to take place between the first electrode and the second electrode and back again during charge and discharge cycles. In more specific embodiments, the electrolyte can constitute an organic electrolyte that includes an aprotic organic solvent, including ionic liquids, and various combinations thereof. Lithium ions in the electrolyte can be derived solely from the first electrode or the second electrode, or a supplemental source of lithium ions (i.e., a lithium salt) can be included in the electrolyte. Suitable lithium salts in this regard can include, but are not limited to, lithium hexafluorophosphate, lithium perchlorate, lithium trifluoromethanesulfonate and lithium tetrafluoroborate. Polymer electrolytes can also be used in conjunction with the various embodiments described herein.

Suitable aprotic organic solvents that can be used in the energy storage devices described herein include, for example, alkyl carbonates (e.g., propylene carbonate, ethylene carbonate, butylene carbonate, dimethyl carbonate, diethyl carbonate, dipropyl carbonate, methyl ethyl carbonate, methyl butyl carbonate, methyl propyl carbonate, ethyl propyl carbonate, butyl propyl carbonate, 1,2-butylene carbonate, 2,3-butylene carbonate, 1,2-pentene carbonate, and 2,3-pentene carbonate), nitriles (e.g., acetonitrile, acrylonitrile, propionitrile, butyronitrile and benzonitrile), sulfoxides (e.g., dimethyl sulfoxide, diethyl sulfoxide, ethyl methyl sulfoxide, and benzylmethyl sulfoxide), amides (e.g., formamide, methylformamide, and dimethylformamide), pyrrolidones (e.g., N-methylpyrrolidone), lactones (e.g., γ-butyrolactone, γ-valerolactone, 2-methyl-γ-butyrolactone, and acetyl-γ-butyrolactone), phosphate triesters, nitromethane, ethers (e.g., 1,2-dimethoxyethane; 1,2-diethoxyethane; 1,2-methoxyethoxyethane; 1,2- or 1,3-dimethoxypropane; 1,2- or 1,3-diethoxypropane; 1,2- or 1,3-ethoxymethoxypropane; 1,2-dibutoxyethane; tetrahydrofuran; 2-methyltetrahydrofuran and other alkyl, dialkyl, alkoxy or dialkoxy tetrahydrofurans; 1,4-dioxane; 1,3-dioxolane; 1,4-dioxolane; 2-methyl-1,3-dioxolane; 4-methyl-1,3-dioxolane; sulfolane; 3-methylsulfolane; methyl ether; ethyl ether; propyl ether; diethylene glycol dialkyl ether; triethylene glycol dialkyl ethers; ethylene glycol, dialkyl ethers; and tetraethylene glycol dialkyl ethers), esters (e.g., alkyl propionates such as methyl or ethyl propionate, dialkyl malonates such as diethyl malonate, alkyl acetates such as methyl acetate and ethyl acetate, and alkyl formates such as methyl formate and ethyl formate); and maleic anhydride.

As alluded to above, ionic liquids constitute an aprotic organic solvent in the context of the present disclosure. Suitable ionic liquids that can be used in conjunction with the present embodiments include, for example, benzyldimethylpropylammonium aluminum tetrachlorate, benzyldimethylammonium imide, ethylmethylammonium bisulfate, 1-butyl-3-methylimidazolium tetrafluoroborate, tetraethylammonium tetrafluoroborate, and the like. Additional ionic liquids can be envisioned by one having ordinary skill in the art.

In various embodiments, the energy storage devices described herein can also include a separator material. Particularly, the separator material can be located between the first electrode and the second electrode when they are disposed in the electrolyte. The electrolyte can be permeable to lithium ions. Accordingly, in various embodiments, the separator material can be a thin dielectric material that allows the first electrode and the second electrode to be electrically isolated from one another, while providing for reversible migration of lithium ions through the separator material during charge and discharge cycles. The separator material is not believed to be particularly limited in composition other than possessing the capacity for allowing a reversible migration of lithium ions to take place therethrough. Suitable separator materials can include, for example, a non-woven polymer fabric such as, for example, polyethylene non-woven fabrics, polypropylene non-woven fabrics, polyester non-woven fabrics, polyacrylonitrile non-woven fabrics, polyamide (e.g., NYLON) non-woven fabrics, and the like. Non-woven cotton fibers con also be used in alternative embodiments. Other suitable separator materials can include porous polymer films such as, for example, polyethylene films, polypropylene films, polytetrafluoroethylene films, polyvinyl chloride films, poly(vinylidene fluoride)hexafluoropropane copolymer films, and the like. Naturally occurring substances such as wood, rubber and asbestos films can also be used in alternative embodiments. Kraft paper and other porous cellulose materials can also be used as a separator material in other various embodiments. Ceramic separator materials can be used in still other various embodiments. Both single and multiple layers of the separator material can be used to provide a desired degree of charge separation between the first electrode and the second electrode.

In some embodiments, the porosity of the separator material can be greater than about 90%, particularly between about 90% and about 95%. In other embodiments, the porosity of the separator material can range between about 40% and about 90%, particularly between about 65% and about 85%. The porosity of the separator material can impact its permeability to lithium ions.

The thickness of the separator material can also impact its permeability to lithium ions. To decrease the ionic permeability, multiple layers of the separator material can be utilized in some embodiments. In some embodiments, the thickness of the separator material can be less than about 100 µm, particularly between about 100 µm and about 50 µm, or between about 50 µm and about 25 µm, or between about 25 µm and about 10 µm. In some embodiments, the thickness of the separator material can be less than about 10 µm, particularly between about 10 µm and about 1 µm, or between about 1 µm and 100 nm.

As described above, the use of a carbon nanotube aerogel, within a first electrode can provide sufficient electrical conductivity such that a metallic current collector can be omitted in some embodiments of the energy storage devices described herein. Omission of the current collector can desirably reduce the weight of the energy storage device as well as its physical footprint.

In other embodiments, however, it can be desirable to utilize a metallic current collector that is in contact with the carbon nanotube aerogel. For example, it can be desirable to maintain the presence of a metallic current collector in order to further enhance electrical conductivity within the energy storage device. In addition, for applications where a high power draw is needed, a metal current collector can also be advantageous. In some embodiments, the metallic current collector, even when used, can be smaller than would a current collector used in a conventional energy storage device of comparable capacity. Thus, even when an optional metallic current collector is present, potential weight and cost savings can still be realized in the embodiments described herein. When present, the composition of the metallic current collector is not believed to be particularly limited. Some suitable metals for the metallic current collector can include, for example, aluminum, nickel, copper, or any combination thereof.

Various quantities of the electroactive material containing sulfur can be present in the embodiments described herein. In general, the quantity of the electroactive material that is present in the first electrode can vary between about 1% of the first electrode by weight to a maximum quantity of the electroactive material that can be housed within the carbon nanotube aerogel. The quantity of the electroactive material in the first electrode can be adjusted to optimize the performance of the energy storage device. Accordingly, in various embodiments, the quantity of the electroactive material can constitute about 1% to about 20% of the first electrode by weight, and more typically, about 1% to about 10% of the first electrode by weight. The foregoing weight percentages are measured relative to the weight of the carbon nanotube aerogel forming the first electrode.

Particular embodiments of the present disclosure will now be described with reference to the drawings.

Figure 3:
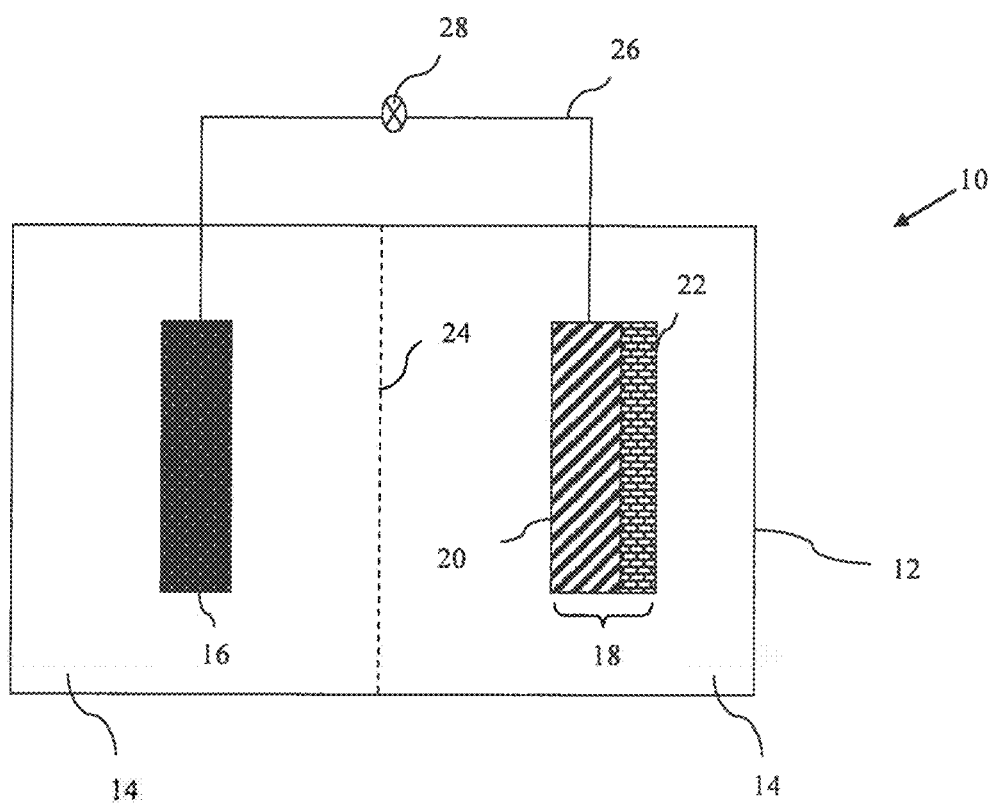
FIG. 3 shows an illustrative schematic of an electrical device of the present disclosure configured as a battery.

FIG. 3 shows an illustrative schematic of an electrical device of the present disclosure configured as a battery. It is to be recognized that various configurations of a battery are possible, and the particular configuration depicted in FIG. 3 should not be seen to limit the scope of the present disclosure. As depicted in FIG. 3, battery 10 includes casing 12 in which electrolyte 14 is housed. Disposed within electrolyte 14 are anode 16 and cathode 18, which are electrically isolated from one another by separator material 24 disposed therebetween. In various embodiments, anode 16 can be formed from lithium metal. Cathode 18 can include carbon nanotube aerogel 20 and optional metallic current collector 22. The electroactive material containing sulfur can be housed within carbon nanotube aerogel 20.

Referring still to FIG. 3, connection 28 can be located within electrical circuit 26 extending between anode 16 and cathode 18. Connection 28 can be an electrical supply during charging, and lithium ions can migrate from cathode 18 to anode 16. During discharging, connection 28 can represent a load, and lithium ions can migrate from anode 16 to cathode 18.

In some embodiments, methods for forming an energy storage device containing a carbon nanotube aerogel are described herein. In more particular embodiments, methods for forming an energy storage device from a carbon nanotube aerogel and a sulfur source are described herein.

In some embodiments, methods for forming an energy storage device can include providing or forming a carbon nanotube aerogel. A more detailed description of carbon nanotube aerogels and techniques for their preparation follows hereinafter.

In some embodiments, a carbon nanotube aerogel can be prepared by freezing a solution of carbon nanotubes and then removing the solvent from the frozen solution by sublimation (i.e., by freeze drying or lyophilizing the frozen solution). That is, in some embodiments, the carbon nanotube aerogel can be formed from a liquid phase containing a plurality of carbon nanotubes, and forming the carbon nanotube aerogel can include subliming the liquid phase. In some embodiments, removing the solvent from the frozen solution can take place under vacuum. In some embodiments, the solution of carbon nanotubes can be placed in a mold or like cavity having a shape and then the solution can be frozen before forming the carbon nanotube aerogel. After removing the solvent, the carbon nanotube aerogel that remains can maintain the shape of the mold, while having a defined pore size in the resulting aerogel structure. Optional machining to a desired shape can take place after removing the carbon nanotube aerogel from the mold.

In some embodiments, methods described herein can further include providing or forming a carbon nanotube aerogel and compressing the carbon nanotube aerogel into a compressed carbon nanotube aerogel. The thickness of the compressed carbon nanotube aerogel can be adjusted as needed to accommodate the physical footprint of the energy storage device in which it is to be deployed. In some embodiments, the compressed carbon nanotube aerogel can have a thickness ranging between about 50 μm and about 150 μm or between about 200 μm and about 750 μm. In other embodiments, the compressed carbon nanotube aerogel can have a thickness ranging between about 200 μm and about 500 μm, or between about 200 μm and about 300 μm, or between about 300 μm and about 400 μm, or between about 400 μm and about 500 μm, or between about 500 μm and about 600 μm, or between about 600 μm and about 700 μm. Factors that can further influence the thickness of the compressed carbon nanotube aerogel include, for example, the concentration of carbon nanotubes in a frozen solution from which solvent is being removed to form the carbon nanotube aerogel, and the magnitude of the compressive force being applied to form the compressed carbon nanotube aerogel.

In some embodiments, the carbon nanotube aerogel can have a pore size that ranges between about 2 nm to about 50 nm. In some embodiments, the carbon nanotube aerogel can have a pore size that ranges between about 15 nm to about 35 nm, or between about 20 nm to about 30 nm. In some embodiments, an average pore size of the carbon nanotube aerogel can range between about 15 nm to about 30 nm, or between about 20 nm to about 30 nm, including about 20 nm, about 21 nm, about 22 nm, about 23 nm, about 24 nm, about 25 nm, about 26 nm, about 27 nm, about 28 nm, about 29 nm or about 30 nm. The pore size can be retained or modified after compression of the carbon nanotube aerogel into a compressed carbon nanotube aerogel. The pore size of the carbon nanotube aerogel can be determined by a number of factors including, for example, the lengths of the carbon nanotubes and the concentration of carbon nanotubes in the solution that is sublimed to form the carbon nanotube aerogel. The pores of the carbon nanotube aerogel can be at least partially filled with the electroactive material according to the embodiments described herein. Optionally, other substances such as, for example, nanoparticles, polymers, resins and the like can also be present within the pores.

In some embodiments, the carbon nanotube aerogel or a compressed carbon nanotube aerogel produced therefrom can nave a substantially uniform pore size, in some embodiments, a few pores that exhibit outlier pore sizes may be produced. In some embodiments, about 10% outlier pore sizes or less can be present, or less than about 1% outlier pore sizes, or less than about 0.1% outlier pore sizes. In general, outlier pore sizes are usually larger than about 50 nm in size. In various embodiments, the porosity of the carbon nanotube aerogel can range between about 30% to about 70%, or between about 40% to about 60%.

The types, lengths or diameters of the carbon nanotubes used to form the carbon nanotube aerogel are not believed to be particularly limited. The carbon nanotube length can, at least in part, determine a pore size of the carbon nanotube aerogel obtained following sublimation of the solvent. In various embodiments, at least a portion of the carbon nanotubes in the carbon nanotube aerogel can be metallic carbon nanotubes.

In some embodiments, the carbon nanotubes can have a length that ranges between about 0.5 μm and 500 μm, including all subranges thereof. In some embodiments, the carbon nanotubes can have a length that ranges between about 0.5 μm and about 5 μm, or between about 1 μm and about 10 μm, or between about 5 μm and about 20 μm, or between about 20 μm and about 50 μm, or between about 50 μm and about 100 μm, or between about 100 μm and about 500 μm.

In some embodiments, the carbon nanotubes can have a diameter that ranges between about 1 nm and about 500 nm, including all subranges thereof. In some embodiments, the carbon nanotubes can have a diameter that ranges between about 1 nm and about 5 nm, or between about 1 nm and about 10 nm, or between about 5 nm and about 20 nm, or between about 20 nm and about 50 nm, or between about 50 nm and about 100 nm.

The types of carbon nanotubes used, in forming the carbon nanotube aerogels are not believed to be particularly limited and can include single-wall carbon nanotubes, double-wall carbon nanotubes, multi-wall carbon nanotubes, and mixtures thereof. The carbon nanotubes used in forming the carbon nanotube aerogel can prepared in any manner, known or presently unknown. A number of carbon nanotube synthesis techniques will be familiar to a person having ordinary skill in the art. The techniques can include, for example, arc discharge across graphite electrodes, pulsed laser ablation of graphite feedstock materials, chemical vapor deposition, and the like. In some embodiments, the carbon nanotubes can be a carbon nanostructure that contains crosslinked carbon nanotubes, carbon nanotubes having shared walls, dendritically branched carbon nanotubes and the like. Carbon nanostructures can be prepared through continuous growth on a fiber substrate, as described in U.S. patent application Ser. Nos. 13/655,348 and 14/035,856, filed on Oct. 18, 2012 and Sep. 24, 2013, respectively, each of which is incorporated herein by reference in its entirety.

In some embodiments, the carbon nanotubes can be functionalized. Functionalization of the carbon nanotubes can increase their solubility in a solvent such that a stable dispersion or true solution of the carbon nanotubes can be attained. Suitable organic functionalities and functionalization techniques for carbon nanotubes will be familiar to one having ordinary skill in the art. Illustrative functional groups that can be added to carbon nanotubes include, for example, carboxylic acids, amines, alcohols, amides, esters, halogens (e.g., fluoride, chloride, bromide and iodide), sulfides, sulfates, and the like. The functional groups can be introduced to the ends or sidewalls of the carbon nanotubes. In some embodiments, the ends of the carbon nanotubes can be opened through oxidation, and carboxylic acid groups can be obtained on the open ends of the carbon nanotubes.

In some embodiments, the carbon nanotubes can be capped with a fullerene-like structure. Stated another way, the carbon nanotubes have closed ends in such embodiments. However, in other embodiments, the carbon nanotubes can remain open-ended. In some embodiments, closed carbon nanotube ends can be opened through treatment with an appropriate oxidizing agent (e.g., $HNO_3/H_2SO_4$). In some embodiments, the carbon nanotubes can encapsulate other materials. In various embodiments, the carbon nanotubes can be functionalized. Functionalized carbon nanotubes can be obtained by the chemical modification of any of the above-described carbon nanotube types. Such modifications can involve the carbon nanotube ends, sidewalls, or both. Chemical modification can include, but is not limited to, covalent bonding, ionic bonding, chemisorption, intercalation, surfactant interactions, polymer wrapping, cutting, solvation, and combinations thereof.

In some embodiments, the carbon, nanotube aerogel can be formed from a liquid phase of carbon nanotubes that includes water alone as a solvent. In other embodiments, one or more water-soluble organic solvents can also be included to promote solubility of the carbon nanotubes in an aqueous solution. Particular water-soluble organic solvents that can be present when forming carbon nanotube aerogels can include, for example, methanol, ethanol, acetonitrile, acetone, tetrahydrofuran and the like. In some embodiments, supercritical carbon dioxide can be used in forming the solution of carbon nanotubes.

In some embodiments, the liquid phase of carbon nanotubes used for forming the carbon nanotube aerogel can have a carbon nanotube concentration ranging between about 1% and about 60% carbon nanotubes by weight. In some or other embodiments, the liquid phase of carbon nanotubes can have a carbon nanotube concentration ranging between about 5% and about 50% carbon nanotubes by weight, or between about 10% and about 20% carbon nanotubes by weight, or between about 20% and about 30% carbon nanotubes by weight, or between about 30% and about 40% carbon nanotubes by weight, or between, about 40% aid about 50% carbon nanotubes by weight. In some embodiments, a liquid phase of carbon nanotubes residing within the above concentration ranges can be prepared by slowly evaporating the solvent from a more dilute liquid phase of carbon nanotubes. For example, a 1% by weight solution of carbon nanotubes can be concentrated to a higher concentration through evaporation of the solvent. In some embodiments, the evaporation rate can be increased by bubbling an inert gas such as nitrogen through the solution of carbon nanotubes.

In some embodiments, the carbon nanotube aerogel can be formed by subliming a frozen concentrated aqueous solution of carbon nanotubes. In some embodiments, subliming can take place under vacuum, such as under a pressure of about 1 torr or less or a pressure of about 0.5 torr or less. In some embodiments, the aqueous solution can be placed in a mold before being frozen and undergoing sublimation. In some embodiments, a release agent can be disposed in the mold to facilitate removal of the carbon nanotube aerogel from the mold once solvent sublimation is complete.

Once a carbon nanotube aerogel has been formed as generally described above, the carbon nanotube aerogel can then be subjected to a compressive force to form a compressed carbon nanotube aerogel. The type of compressive force is not believed to be particularly limited. The type and amount of compressive force applied can be dependent upon the desired thickness and density of the carbon nanotube aerogel after compression. In some embodiments, the compressive force can be applied by a hydraulic press. In such embodiments, the compressive force can be up to about 25 tons. In other embodiments, a smaller compressive force can be applied by techniques such as squeezing, vacuum bagging, or rolling the as-produced carbon nanotube aerogel.

Once a carbon nanotube aerogel has been formed or provided, an energy storage device can be fabricated according to various embodiments described herein. In some embodiments, methods for fabricating an energy storage device can include incorporating an electroactive material containing sulfur in a carbon nanotube aerogel, compressing the carbon nanotube aerogel to form a compressed carbon nanotube aerogel, and disposing a first electrode containing the compressed carbon nanotube aerogel and the electroactive material in an electrolyte with a second electrode and a plurality of lithium ions. The first electrode and the second electrode have a separator material therebetween that is permeable to the lithium ions.

Various techniques can be used to incorporate the electroactive material containing sulfur within the carbon nanotube aerogel. Both liquid and vapor infiltration processes can be used in this regard, as described hereinafter.

In some embodiments, incorporating the electroactive material in the carbon nanotube aerogel can include infiltrating the carbon nanotube aerogel with molten sulfur. Since elemental sulfur has a melting point that is well below the decomposition temperature of carbon nanotubes, it can be easily melted, and when placed in contact with the carbon nanotube aerogel, the molten sulfur can readily infiltrate into the carbon nanotube aerogel. In some embodiments, the molten sulfur can be formed by heating elemental sulfur, and the molten sulfur can be contacted with a non-heated carbon nanotube aerogel. More desirably, however, the carbon nanotube aerogel can be heated, so as to mitigate potential re-solidification of molten sulfur prior to its incorporation within the porosity of the carbon nanotube aerogel. In some embodiments, heating of elemental sulfur to form molten sulfur can take place by using the carbon nanotube aerogel itself to affect heating. In more particular embodiments, heating the elemental sulfur can take place by resistive heating of the carbon nanotube aerogel. In still more particular embodiments, infiltrating the carbon nanotube aerogel, with molten sulfur can include providing elemental sulfur in a solid state, contacting the elemental sulfur with the carbon nanotube aerogel, and resistively heating the carbon nanotube aerogel to form the molten sulfur.

The contact time of the molten sulfur with the carbon nanotube aerogel can be chosen such that infiltration of the molten sulfur into the carbon nanotube aerogel progresses to a desired degree. In various embodiments, the contact time can range between about 1 minute and about 24 hours, or between about 5 minutes and about 12 hours. In some embodiments, the carbon nanotube aerogel and the molten sulfur can be placed in a sealed container while infiltration is taking place, so as to decrease the propensity for sulfur to sublime while being heated to a molten state. In various embodiments, the contact temperature can range between the melting point of sulfur and about 250° C., or between about 120° C. and about 200° C., or between about 140° C. and about 180° C., or between about 150° C. and about 170° C.

In alternative embodiments, a solution process can be used to incorporate the electroactive material within the carbon nanotube aerogel. For example, in some embodiments, a sulfur-containing salt can be dissolved in a suitable solvent and exposed to the carbon nanotube aerogel.

In still other alternative embodiments, incorporating the electroactive material in the carbon nanotube aerogel can take place by a vapor process. In more specific embodiments, incorporating the electroactive material in the carbon nanotube aerogel can include infiltrating the carbon nanotube aerogel with sulfur vapor. Vapor infiltration processes of the carbon nanotube aerogel can be particularly advantageous when it is desired to limit the quantity of sulfur being incorporated. For example, if infiltration of the carbon nanotube aerogel with molten sulfur produces an energy storage device with an undesirable performance, a vapor infiltration process can be used as an alternative.

Incorporation of the electroactive material within the carbon nanotube aerogel can take place before or after compression of the carbon nanotube aerogel to form a compressed carbon nanotube aerogel. In some embodiments, incorporating the electroactive material in the carbon nanotube aerogel can take place before compressing the carbon nanotube aerogel. More desirably, however, in other embodiments, incorporating the electroactive material in the carbon nanotube aerogel can take place after compressing the carbon nanotube aerogel.

EXAMPLES

Example 1: Properties of Carbon Nanotube Aerogels and Compressed Carbon Nanotube Aerogels Table 1 shows illustrative surface area data for carbon nanotube aerogels, both before and after compression. In comparison to an ordinary carbon (graphite) standard. As can be seen, the surface area of both compressed and uncompressed carbon nanotube aerogels was significantly greater than that of ordinary carbon.

TABLE 1

| Sample | Sample Weight (g) | Single Point Surface Area at $P/P_0$ ($m^2/g$) | BET Surface Area ($m^2/g$) |
| --- | --- | --- | --- |
| Carbon | 0.3762 | 20.65 | 21.06 |
| Uncompressed Aerogel | 0.0188 | 186.02 | 194.66 |
| Uncompressed Aerogel #2 | 0.0240 | 178.04 | 187.14 |
| Compressed Aerogel | 0.0354 | 171.62 | 176.41 |
| Compressed Aerogel (25 ton) | 0.0392 | 188.60 | 199.36 |
| Compressed Aerogel (25 ton #2) | 0.0387 | 193.42 | 203.98 |

Table 2 shows illustrative resistivity data in relation to thickness, density and porosity for various compressed carbon nanotube aerogels.

TABLE 2

| Compression Process | Average Sheet Resistivity (Ω/sq) | Average Aerogel Thickness (μm) | Density (g/cm$^3$) | Calculated Porosity (%) |
| --- | --- | --- | --- | --- |
| 30 ton compression | 0.38 | 62 | 0.75 | 50 |
| 25 ton compression | 0.35 | 115 | 0.70 | 53 |
| 1 ton roller compression | 0.37 | 58 | 0.72 | 52 |

Example 2: Voltage Cycling Behavior of an Illustrative Energy Storage Device

Figure 4:
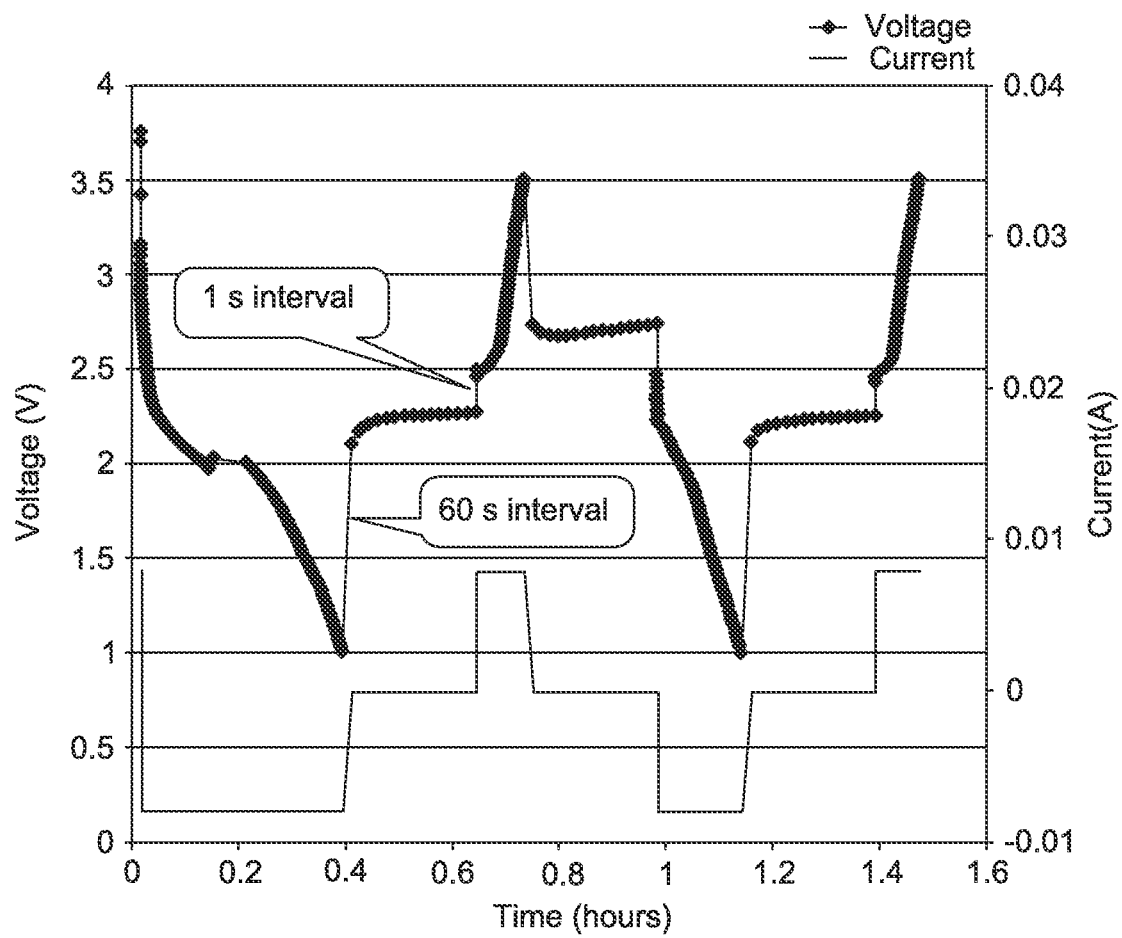
FIG. 4 shows the voltage cycling behavior of an illustrative sulfur-based battery prepared according the embodiments described herein.
Figure 5:
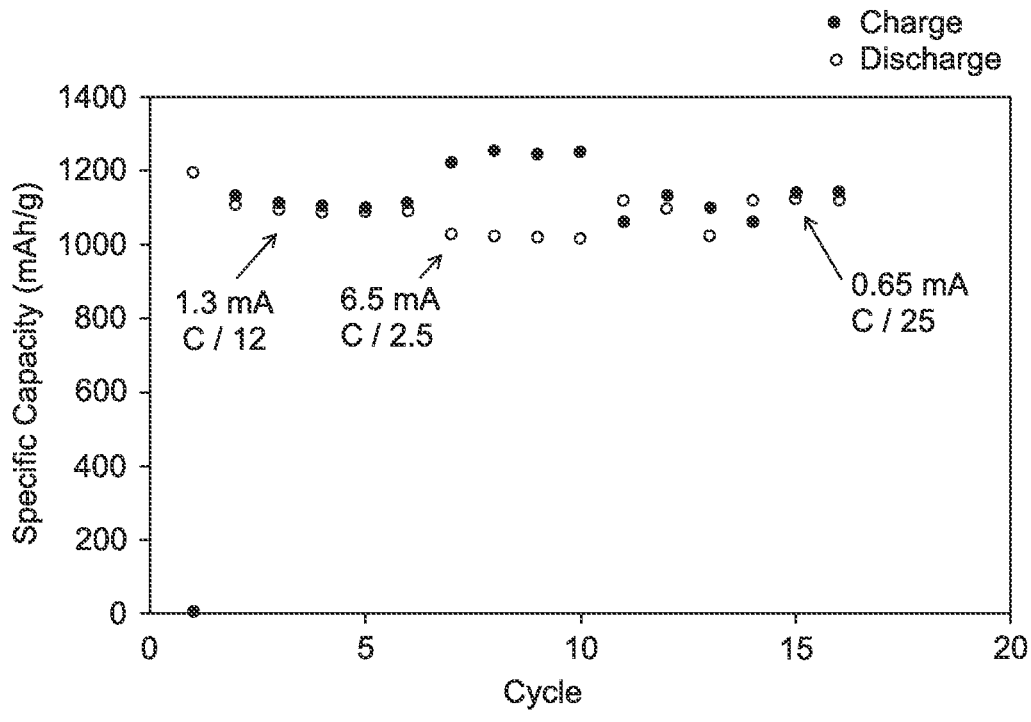
FIG. 5 shows the voltage cycling behavior of another illustrative sulfur-based battery prepared according the embodiments described herein.

FIG. 4 shows the voltage cycling behavior of an illustrative sulfur-based battery prepared according the embodiments described herein. Although the battery performance illustrated in FIG. 4 is non-idealized, it does demonstrate the workability of this approach. Without being bound by theory or mechanism, it is believed that the depicted performance in FIG. 4 is due to a sulfur loading that is too high in the battery. FIG. 5 shows the voltage cycling behavior of another illustrative sulfur-based battery prepared according the embodiments described herein.

Although the invention has been described with reference to the disclosed embodiments, those skilled in the art will readily appreciate that these only illustrative of the invention. It should be understood that various modifications can be made without departing from the spirit of the invention. The invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is the following:

1. An energy storage device comprising:
   a first electrode comprising:
      a carbon nanotube aerogel having pores present therein; wherein the carbon nanotube aerogel comprises crosslinked carbon nanotubes, carbon nanotubes having shared walls, or dendritically branched carbon nanotubes; and
      an electroactive material comprising sulfur that at least partially fills the pores of the carbon nanotube aerogel,
   wherein the energy storage device does not include a current collector.

2. The energy storage device of claim 1, wherein the carbon nanotube aerogel is compressed using a mechanical force.

3. The energy storage device of claim 1, further comprising:
   a second electrode.

4. The energy storage device of claim 3, further comprising:
   a plurality of lithium ions configured to reversibly travel between the first electrode and the second electrode.

5. The energy storage device of claim 4, wherein the energy storage device comprises a battery, the first electrode comprising a cathode and the second electrode comprising an anode.

6. The energy storage device of claim 5, further comprising:
   an electrolyte in which the first electrode and the second electrode are disposed; and
   a separator material between the first electrode and the second electrode, the separator material being permeable to the lithium ions.

7. The energy storage device of claim 1, wherein the electroactive material comprises about 1% to about 10% of the first electrode by weight.

8. The energy storage device of claim 1, wherein the electroactive material comprises elemental sulfur or a polymorph thereof.

9. A method comprising:
   incorporating an electroactive material comprising sulfur into a carbon nanotube aerogel having pores present therein, the electroactive material at least partially filling the pores,
   wherein the carbon nanotube aerogel comprises crosslinked carbon nanotubes, carbon nanotubes having shared walls, or dendritically branched carbon nanotubes;

compressing the carbon nanotube aerogel using a mechanical force to form a compressed carbon nanotube aerogel; and disposing a first electrode comprising the compressed carbon nanotube aerogel and the electroactive material in an electrolyte with a second electrode and a plurality of lithium ions, the first electrode and the second electrode having a separator material located therebetween that is permeable to the lithium ions, wherein the carbon nanotube aerogel and the electroactive material does not include a current collector.

10. The method of claim 9, wherein the electroactive material comprises elemental sulfur or a polymorph thereof.

11. The method of claim 9, further comprising:
providing elemental sulfur in a solid state;
contacting the elemental sulfur with the carbon nanotube aerogel; and
resistively heating the carbon nanotube aerogel to form the molten sulfur.

12. The method of claim 9, wherein incorporating the electroactive material in the carbon nanotube aerogel takes place before compressing the carbon nanotube aerogel.

13. The method of claim 9, wherein incorporating the electroactive material in the carbon nanotube aerogel takes place after compressing the carbon nanotube aerogel.

14. The method of claim 9, wherein the electroactive material comprises about 1% to about 10% of the first electrode by weight.

15. The method of claim 9, further comprising:
contacting the compressed carbon nanotube aerogel with a metallic current collector, the first electrode comprising the metallic current collector, the compressed carbon nanotube aerogel, and the electroactive material.

16. The method of claim 9, further comprising:
forming the carbon nanotube aerogel from a liquid phase comprising a plurality of carbon nanotubes.

17. The method of claim 16, wherein forming the carbon nanotube aerogel comprises subliming the liquid phase.

18. The method of claim 9, wherein incorporating the electroactive material in the carbon nanotube aerogel comprises infiltrating the carbon nanotube aerogel with molten sulfur.

* * * * *